US007438378B2

(12) United States Patent
Reichelsheimer et al.

(10) Patent No.: US 7,438,378 B2
(45) Date of Patent: Oct. 21, 2008

(54) FLUORESCENT INK DETECTOR

(75) Inventors: Jay Reichelsheimer, Shelton, CT (US); David B. Wilk, Clinton, CT (US); Luis A. Sanchez, Hamden, CT (US)

(73) Assignee: Pitney Bowes Inc., Stamford, CT (US)

( * ) Notice: Subject to any disclaimer, the term of this patent is extended or adjusted under 35 U.S.C. 154(b) by 272 days.

(21) Appl. No.: 10/929,170

(22) Filed: Aug. 30, 2004

(65) Prior Publication Data

US 2006/0044341 A1 Mar. 2, 2006

(51) Int. Cl.
*B41J 29/393* (2006.01)
*B41J 3/01* (2006.01)
*G01D 11/00* (2006.01)

(52) U.S. Cl. .............................. 347/19; 347/2; 347/100

(58) Field of Classification Search .................... 347/19
See application file for complete search history.

(56) References Cited

U.S. PATENT DOCUMENTS

| | | | | |
|---|---|---|---|---|
| 3,973,118 | A * | 8/1976 | LaMontagne | 250/226 |
| 4,015,131 | A * | 3/1977 | McDonough et al. | 250/461.1 |
| 4,451,521 | A * | 5/1984 | Kaule et al. | 428/199 |
| 4,716,456 | A | 12/1987 | Hosaka | 358/509 |
| 4,971,276 | A | 11/1990 | Tannenbaum | 235/462.01 |
| 5,347,129 | A * | 9/1994 | Miller et al. | 250/336.1 |
| 5,502,304 | A * | 3/1996 | Berson et al. | 235/491 |
| 5,554,842 | A * | 9/1996 | Connell et al. | 235/491 |
| 5,971,276 | A * | 10/1999 | Sano et al. | 235/462.01 |
| 6,024,020 | A * | 2/2000 | Romano et al. | 101/484 |
| 6,039,257 | A | 3/2000 | Berson et al. | 235/468 |
| 6,297,508 | B1 * | 10/2001 | Barmore et al. | 250/459.1 |
| 6,303,929 | B1 * | 10/2001 | Oshima et al. | 250/271 |
| 6,322,192 | B1 * | 11/2001 | Walker | 347/19 |
| 6,435,642 | B1 * | 8/2002 | Jackson et al. | 347/19 |
| 6,514,704 | B2 * | 2/2003 | Bruce et al. | 435/6 |
| 6,561,612 | B2 * | 5/2003 | Minckler | 347/19 |
| 6,576,155 | B1 * | 6/2003 | Barbera-Guillem | 252/301.36 |
| 6,827,769 | B2 * | 12/2004 | Auslander et al. | 106/31.32 |
| 7,129,506 | B2 * | 10/2006 | Ross et al. | 250/556 |
| 2002/0002410 | A1 | 1/2002 | Naoki et al. | 700/67 |
| 2005/0129229 | A1 * | 6/2005 | Auslander et al. | 380/55 |
| 2006/0044341 | A1 | 3/2006 | Reichelsheimer et al. | 347/19 |

FOREIGN PATENT DOCUMENTS

| | | | |
|---|---|---|---|
| EP | 0219847 A2 | | 10/1986 |
| EP | 0219847 A | | 4/1987 |
| EP | 0714777 A1 | | 11/1995 |
| EP | 0863012 A1 | | 3/1998 |
| EP | 0875384 A2 | | 11/1998 |
| JP | 2001/113771 | | 4/2001 |
| JP | 2001113771 A | * | 4/2001 |
| WO | 01/17784 A1 | | 3/2001 |
| WO | 01/21405 A3 | | 3/2001 |
| WO | WO01/17784 | | 3/2001 |

* cited by examiner

*Primary Examiner*—Matthew Luu
*Assistant Examiner*—Shelby Fidler
(74) *Attorney, Agent, or Firm*—George M. Macdonald; Angelo N. Chaclas

(57) ABSTRACT

A printer luminescent ink sensor for a printing device including a radiant energy source; and a photodetector located downstream from a print head of the printing device. The photodetector is adapted to detect luminescent energy from an indicium printed by the print head, upon exposure to radiant energy from the radiant energy source, substantially immediately after the indicium is printed.

14 Claims, 5 Drawing Sheets

OUTPUT FROM PHOTOTRANSISTOR– COMPLEX WAVEFORM GENERATED

FLUORESCENT INK DETECTOR

BACKGROUND OF THE INVENTION

1. Field of the Invention

The present invention relates to printing and, more particularly, to detecting in a printing device the printing of a luminescent ink.

2. Brief Description of Prior Developments

Currently there is no way for a postage meter to determine if a fluorescent ink is being used in a postage meter. Furthermore, there is no way of identifying if either a fluorescent ink is printed or if a fluorescent ink indicium is missing due to a mechanical/electrical problem with the print head. It is important for a postage meter manufacturer to be aware of any of these outcomes to warrant that its meters operate as designed. Any solution to these problems must also be small enough to be implemented in mailing machines. There are sophisticated instruments, unrelated to printers or postage meters, which can give a fluorescent spectral response, but these instruments are very large and expensive.

Currently many postage meter manufacturers place microchips on their ink cartridges to prevent the printer (or meter) from printing with a counterfeit or wrong ink color cartridge. This protects the integrity of the equipment and prevents the printer from being damaged by counterfeit ink. These chips have to be placed on each of the millions of cartridges produced, and are a significant expense. There is a desire to provide an alternative way of solving this problem. There is a desire to provide a Read After Print (RAP) sensor to protect supplies revenue and prevent damage to postage meters from unauthorized ink usage.

SUMMARY OF THE INVENTION

In accordance with one aspect of the present invention, a printer luminescent ink sensor for a printing device is provided including a radiant energy source; and a photodetector located downstream from a print head of the printing device. The photodetector is adapted to detect luminescent energy from an indicium printed by the print head, upon exposure to radiant energy from the radiant energy source, substantially immediately after the indicium is printed.

In accordance with another aspect of the present invention, a printer fluorescent ink sensor for a printing device is provided comprising a radiant energy source; and a system for determining quality of fluorescence of an indicium printed by a print head of the printing device. The system comprises a fluorescent ink photodetector located downstream from the print head.

In accordance with one method of the present invention, a method of printing luminescent ink in a printing device is provided comprising printing an indicium on an article at a print head of the printing device; radiating energy towards the printed indicium; and detecting energy emitted by the indicium at a sensing location in the printing device downstream of the print head.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
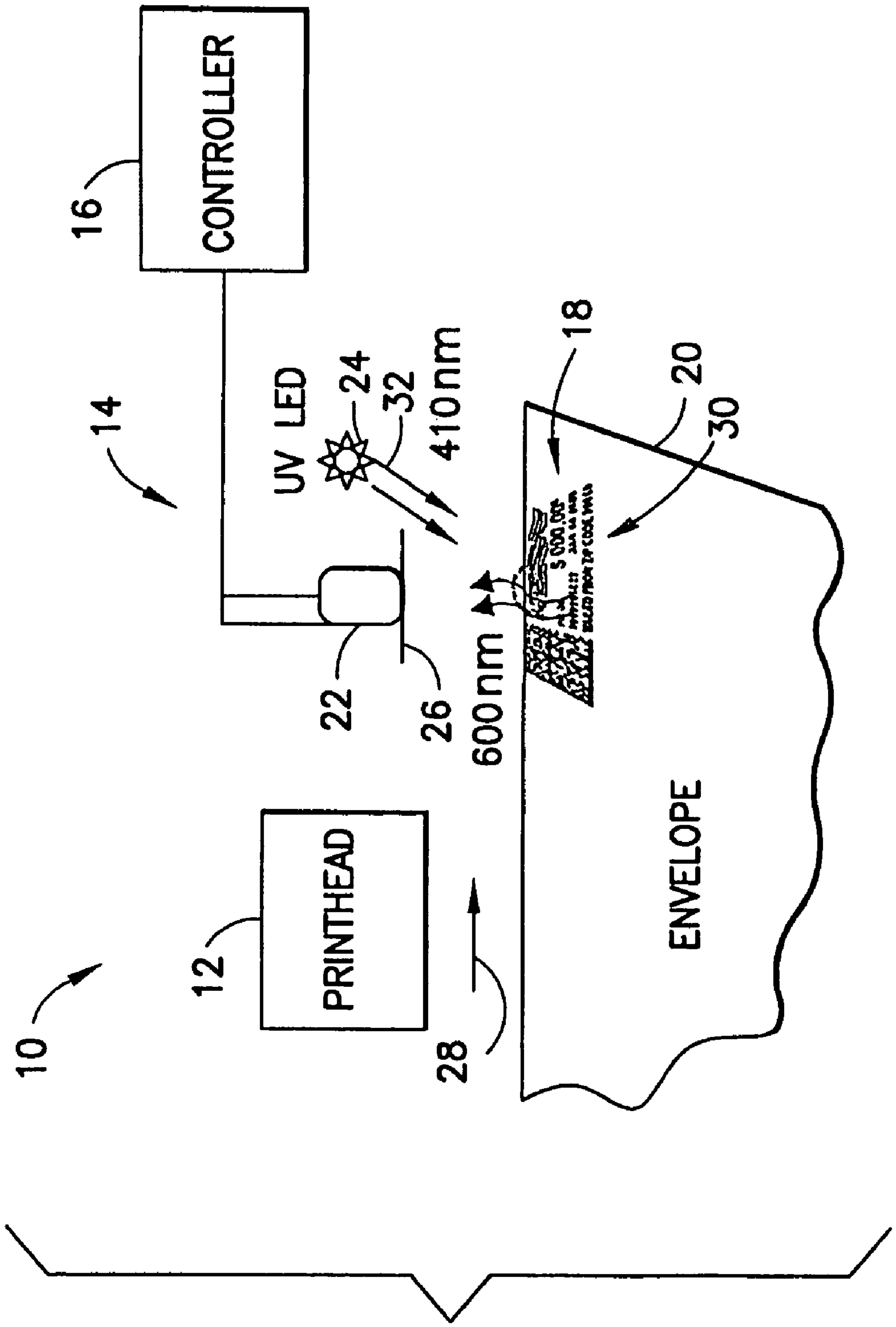
FIG. 1 is a diagram showing some components of a postage meter incorporating features of the present invention.

Referring to FIG. 1, there is shown a diagram of some components of a postage meter 10 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

The postage meter 10 generally comprises a print head 12, a printer luminescent ink sensor 14, and a controller 16. The postage meter 10 preferably comprises other features such as a display, an input device, and a data communications device (such as a modem), not shown. Although the present invention is being described with reference to use in a postage meter, features of the present invention could be used in any suitable type of printing device which is adapted to print an indicium with luminescent ink, such as fluorescent ink or phosphorescent ink.

The print head 12 is adapted to print a postage indicium 18 on an article 20, such as an envelope or an adhesive paper strip. The print head 12 uses an ink jet printing method. The ink used to print the indicium 18 preferably comprises fluorescent ink. Color fluorescent inks, including black fluorescent ink, are known such as described in U.S. patent application publication Nos. US 2002/0195586 A1, US 2003/0005303 A1, and US 2003/0041774 A1, which are hereby incorporated by reference in their entireties. The color fluorescent ink could be any suitable color including, for example, red or blue. Invisible ink jet inks are also described in U.S. patent application Ser. No. 10/331829 filed Dec. 30, 2002 which is also hereby incorporated by reference in its entirety. Use of fluorescent inks for hidden indicium is described in U.S. patent application Ser. No. 10/692,569, filed Oct. 24, 2003, which is also hereby incorporated by reference in its entirety.

Luminescent ink, such as fluorescent ink, can be used by a government postal service, such as the U.S. Postal Service (USPS), to validate or confirm that a postage indicium is authentic. The luminescent ink can also be used to place a marking on a postage indicium by the postal service to indicate that the postage value has been used or consumed. As noted above, in the past there was no way for a postage meter to determine if fluorescent ink was being used in the postage meter. Furthermore, there was no way of identifying in the postage meter itself if either a fluorescent ink was printed, or if a fluorescent ink indicium was missing or incomplete due to a mechanical/electrical problem with the print head.

The present invention comprises the sensor 14 to overcome these problems. The sensor 14 is located downstream from the print head 12. In other words, as the article 20 moves in direction 28, the indicium 18 is printed by the print head and then moves along a sensing location 30 at the sensor 14. The sensor 14 generally comprises a photodetector 22 and a radiant energy source or excitation source 24. The photodetector 22 generally comprises a light-to-voltage sensor. However, any suitable type of photodetector could be used. The radiant energy source 24 generally comprises an ultraviolet (UV) light emitting diode (LED). The LED comprises a 410 nm LED. However, any suitable type of radiant energy source could be used. The sensor 14 also comprises a filter 26. The filter 26 is a wavelength filter, such as a 550 nm high pass filter. However, any suitable filter could be provided whether it be a physical filter or a coating on the optical lens. The filter is located in front of the light-to-voltage sensor, between the light-to-voltage sensor and the indicium 18.

By using an ultraviolet (UV) light emitting diode (LED) and a detection system located downstream from the print head, the postage meter can determine the type of ink (fluorescent or non-fluorescent) that was printed on the envelope. The postage meter can use this information to warn the user of problems with the ink supply or if the wrong ink has been used. These are problems which can now be addressed by the drop in cost of detector components (UV LED, phototransistors).

Figure 2:
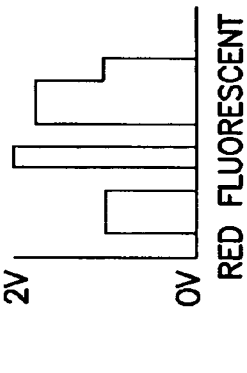
FIG. 2 is a chart showing of signals sent by the photodetector to the controller of FIG. 1 when the indicium being read is properly printed using red fluorescent ink.
Figure 3:
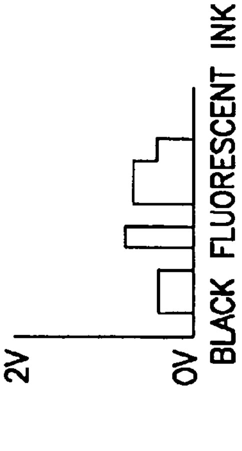
FIG. 3 is a chart showing signals sent by the photodetector to the controller of FIG. 1 when the indicium being read is properly printed using black fluorescent ink.
Figure 4:
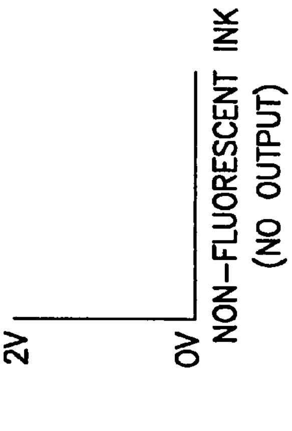
FIG. 4 is a chart showing signals sent by the photodetector to the controller of FIG. 1 when the indicium being read is printed using non-fluorescent ink or not properly printed using fluorescent ink.

Referring also to FIGS. 2-4, charts are shown of signals sent by the photodetector 22 to the controller 16. FIG. 2 illustrates a signal pattern when the indicium 18 is properly printed using red fluorescent ink. FIG. 3 illustrates a signal pattern when the indicium 18 is properly printed using black fluorescent ink. FIG. 4 illustrates a signal pattern when the indicium 18 is properly printed using non-fluorescent ink or when the indicium is not properly printed with fluorescent ink. The voltage outputs from the photodetector can be summarized as follow:

| Output | Ink Type |
|---|---|
| 1 V-2 V | Red Fluorescent Ink |
| 0.5 V-1 V | Black Fluorescent Ink |
| Less than 0.5 V | Non-Fluorescent Ink (or insufficient fluorescent ink) |

A method for producing a small, low cost, fluorescence detection system can be provided to identify:

a fluorescent ink type or that a non-fluorescent ink type was printed; and/or that the print head is functioning properly; and/or that a good print (good quality fluorescent indicium) was made.

With a low cost device (the sensor 14), such as less than $10.00, the meter can determine if the ink used to print the indicium 18 is fluorescent or not right after printing of the indicium 18 by the print head 12. If the sensor 14 detects that the indicium 18 is not properly printed (such as with insufficient fluorescent ink), or was printed without fluorescent ink, the meter can display an error message and warn the user to obtain the ink needed. Additionally, this sensor system can validate the indicium and insure there is enough fluorescence in the indicium 18 for the mail piece 20 to be faced by a USPS Facer-Canceller system.

This invention can consist of an ultraviolet light emitting diode (UV-LED), a wavelength filter (such as a 550 nm or 600 nm high pass filter for example), and a light-to-voltage sensor. The UV-LED 24 can provide 410 nm light energy to the printed indicium. The indicium 18, if fluorescent, can transform the UV light 32 into 600 nm orange light. The light-to-voltage sensor 22, fitted with a special filter 26, can absorb (detect) 600 nm light and convert it to an output voltage. If software in the postage meter does not detect this voltage spike, the meter can report an error; signaling no print or printing with the wrong ink or insufficient fluorescent ink.

With a given ink, the expected voltage change is consistent and known. The shape of the waveform outputted by the light-to-voltage sensor can be analyzed. Any change in the magnitude of the waveform outside the set parameters (more or less fluorescence) can indicate that a different ink (unapproved ink or competitor ink) is in use, or that there has been a print head failure. If differences in the width of the waveform peaks (such as the peaks shown in FIGS. 2 and 3) are detected, it can indicate that the print head nozzles may be clogged and that a full print is not being achieved.

Referring now also to FIGS. 5-8, postage meter 40 with a system and method can be provided for producing a small, low cost, fluorescence detection system to identify unique spectral characteristics of a particular ink. This can consist of an ultraviolet light emitting diode (UV-LED) 24, a set of filters 26, 34, 36 with different narrow bandpass wavelengths or different transmission rates, and several light-to-voltage sensors 22. The UV-LED 24 can provide 410 nm light energy to the printed indicium 18. The indicium 18, if fluorescent, can transform the UV light 32 into a longer wavelength fluorescent emission. The light-to-voltage sensors 22 can be fitted with special filters 26, 34, 36 that will absorb (detect) fluorescent light and convert it to an output voltage. Each light-to-voltage sensor 22 can look for fluorescence in a different wavelength region. Thus, multiple detectors can be used to build a complex (multiple) and perhaps complete fluorescent spectra of the ink used in the indicium. Additionally, an infrared (IR) detector 42 can be added to detect the presence of black pigments in the ink.

Figure 6:
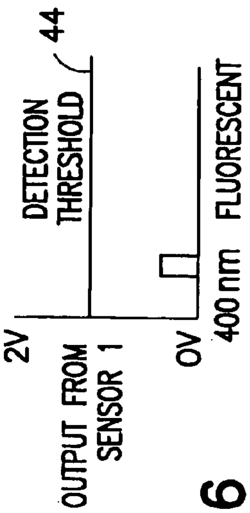
FIG. 6 is a chart showing a signal sent by a first sensor of the photodetector of FIG. 5 to the controller of the postage meter.
Figure 7:
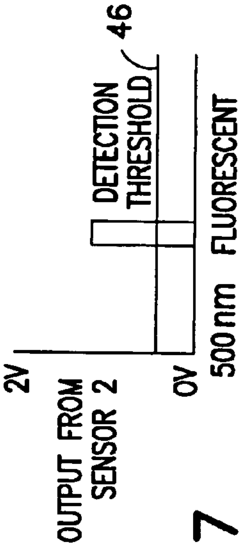
FIG. 7 is a chart showing signal sent by a second sensor of the photodetector of FIG. 5 to the controller.
Figure 8:
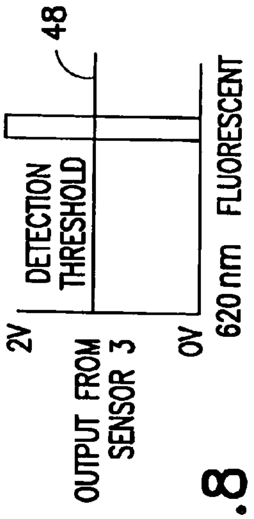
FIG. 8 is a chart showing signal sent by a third sensor of the photodetector of FIG. 5 to the controller.
Figure 5:
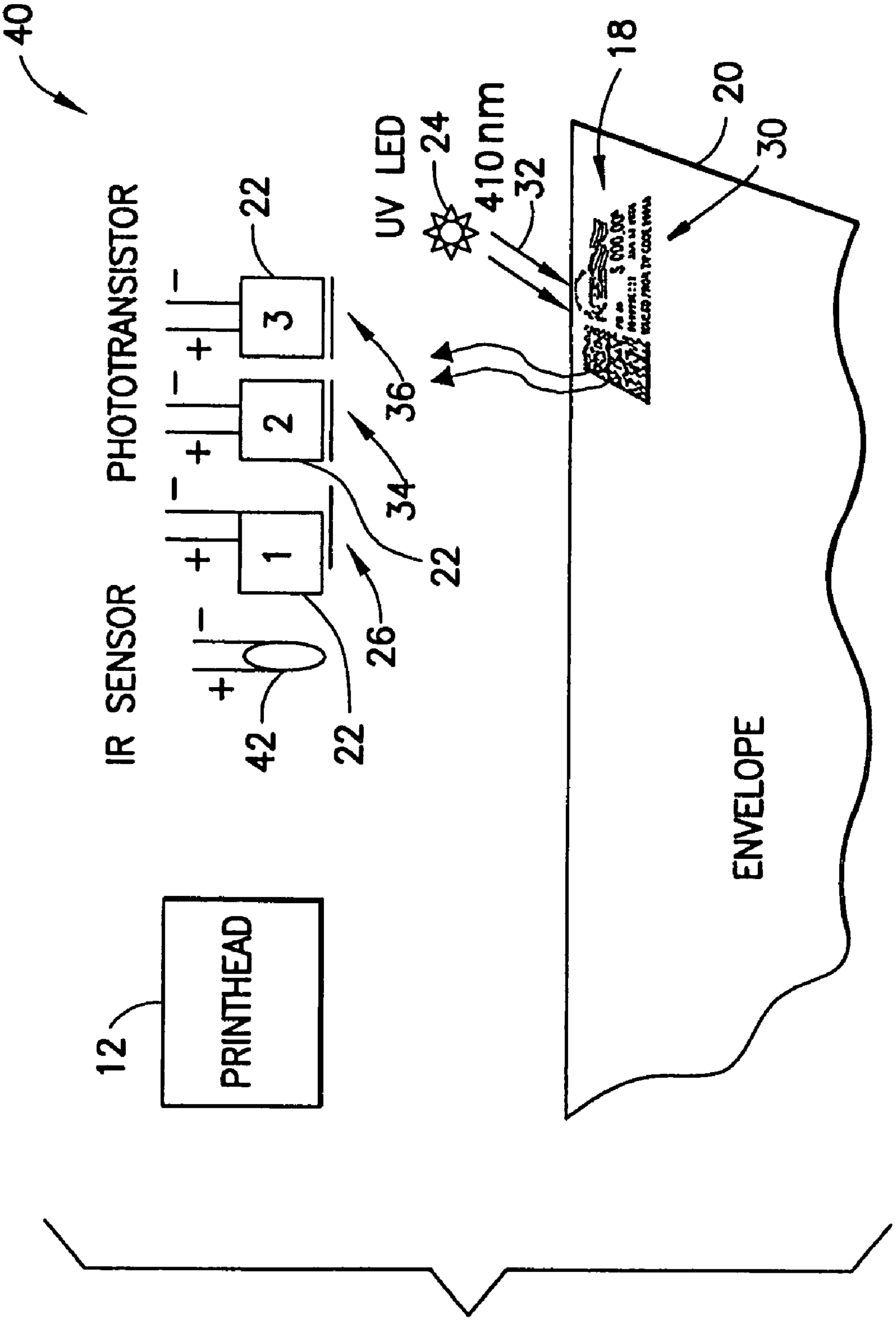
FIG. 5 is a diagram showing some components of a postage meter of an alternate embodiment of the present invention.

In the diagram of FIG. 5 narrow bandpass filters 26, 34, 36 of 400 nm, 500 nm and 620 nm are used to obtain the fluorescent intensity at that wavelength. However, in alternate embodiments more or less than three filters and light-to-voltage sensors could be used. In addition, the filters could have any suitable bandpass. FIG. 6 illustrates a signal from the first 1 light-to-voltage sensor 22 with first filter 26 when reading the indicium 18. FIG. 7 illustrates a signal from the second 2 light-to-voltage sensor 22 with second filter 34 when reading the indicium 18. FIG. 8 illustrates a signal from the third 3 light-to-voltage sensor 22 with third filter 36 when reading the indicium 18.

In one type of embodiment, the photodetector could have a minimum detection threshold which can be set to give a discrete value for a particular ink or fluorescence wavelength, such as detection thresholds 44, 46 and 48 shown in FIGS. 6-8. If the ink is above the threshold it can be assigned a value of "1". If the ink is below the threshold it can be assigned a value of "0" (i.e. 0, 1, 1 for the illustration in FIGS. 5-8). Other types of fluorescent ink can have a digital signal of 1,0,0; or 1,1,0; etc. Thus, the photodetector can differentiate between different fluorescent inks by the use of multiple photosensors; each adapted to sense a different wavelength. A non-fluorescent ink would have no fluorescence and would give a value of zero on all three detectors 22 (0,0,0). This can be extended to include multiple detectors and give further differentiation between inks.

There are no commercially available products that specifically detect red fluorescent emissions. Spectrophotometers and the like are available, but cost tens of thousands of dollars. The current invention can cost less than $10.00 to produce. This invention can comprise placing a multiple detector system (2 or more light detectors) on a postage meter or a printer itself. The sensing system can determine multiple spectra characteristics of the ink's spectra that was printed. This enables software in the postage meter or printer to determine which ink has been printed, and can display an error message if the wrong ink is installed, or insufficient ink was used to print the indicium, or if the wrong ink was used. Also, by using a UV LED and a detection system located downstream from the print head, the postage meter or fluorescent ink printer can determine the type of ink (fluorescent, non-fluorescent, or black pigment based) that was printed on the article 20. The postage meter or printer can use this information to warn the user of problems with the ink supply or if the wrong ink has been used, such as by displaying an error message on the display and/or making an audible sound.

Figure 9:
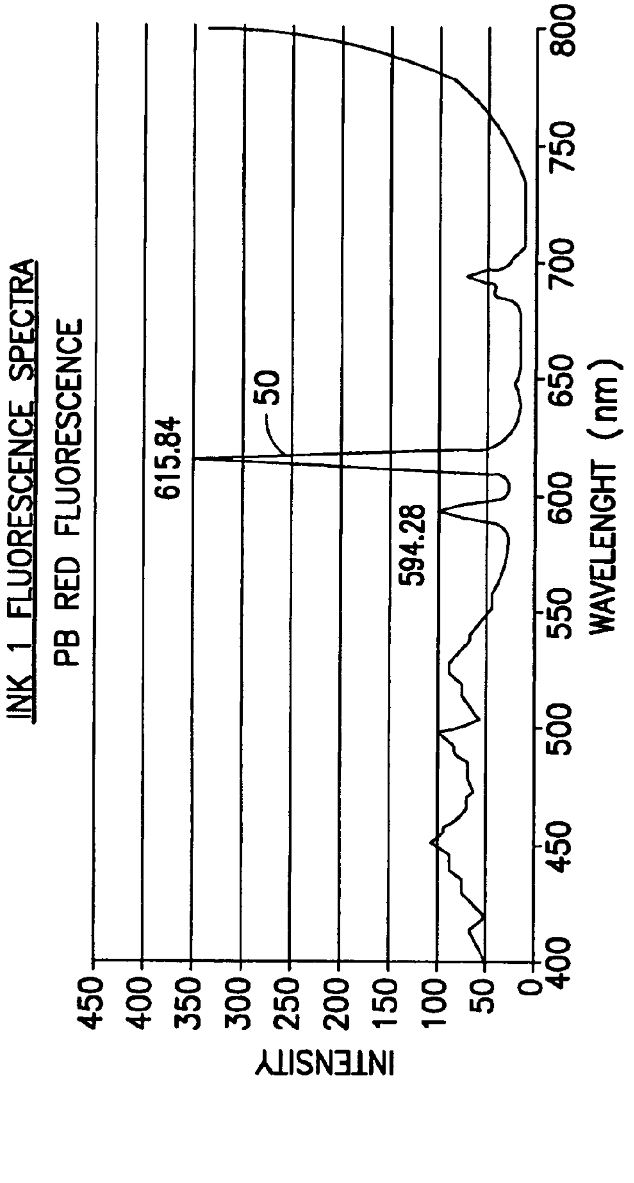
FIG. 9 shows a chart of a fluorescence spectra of intensity versus wavelength for a first fluorescent ink.
Figure 10:
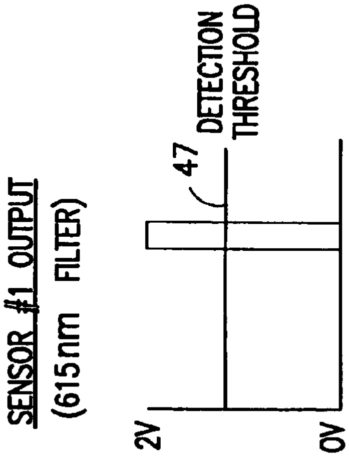
FIG. 10 is a chart which illustrates a signal from a first light-to-voltage sensor with a 615 nm filter when reading indicium printed with the ink of FIG. 9.
Figure 11:
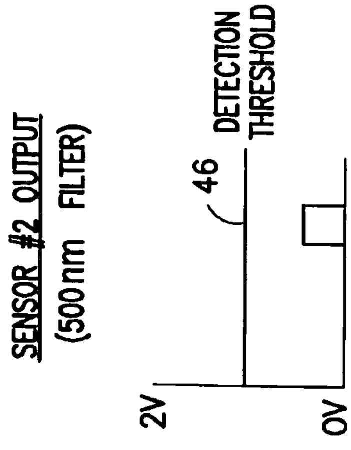
FIG. 11 is a chart which illustrates a signal from a second light-to-voltage sensor with a 500 nm filter when reading indicium printed with the ink of FIG. 9.

Referring now also to FIGS. 9-11, FIG. 9 shows a fluorescence spectra of intensity versus wavelength for a first fluorescent ink 50. In this embodiment the ink 50 comprises a red fluorescent ink sold by the postage meter manufacturer. A system could be provided with only two photosensors; such as one with a 615 nm filter and one with a 500 nm filter. FIG. 10 illustrates a signal pattern from a first light-to-voltage sensor 22 with a 615 nm filter when reading the indicium 18 printed with the ink 50. FIG. 11 illustrates a signal pattern from a second light-to-voltage sensor 22 with a 500 nm filter when reading the indicium 18 printed with the ink 50. Again, using the detection thresholds 47, 46, the output from the photodetector would be 1,0 when reading an indicium printed with the red fluorescent ink 50.

Figure 12:
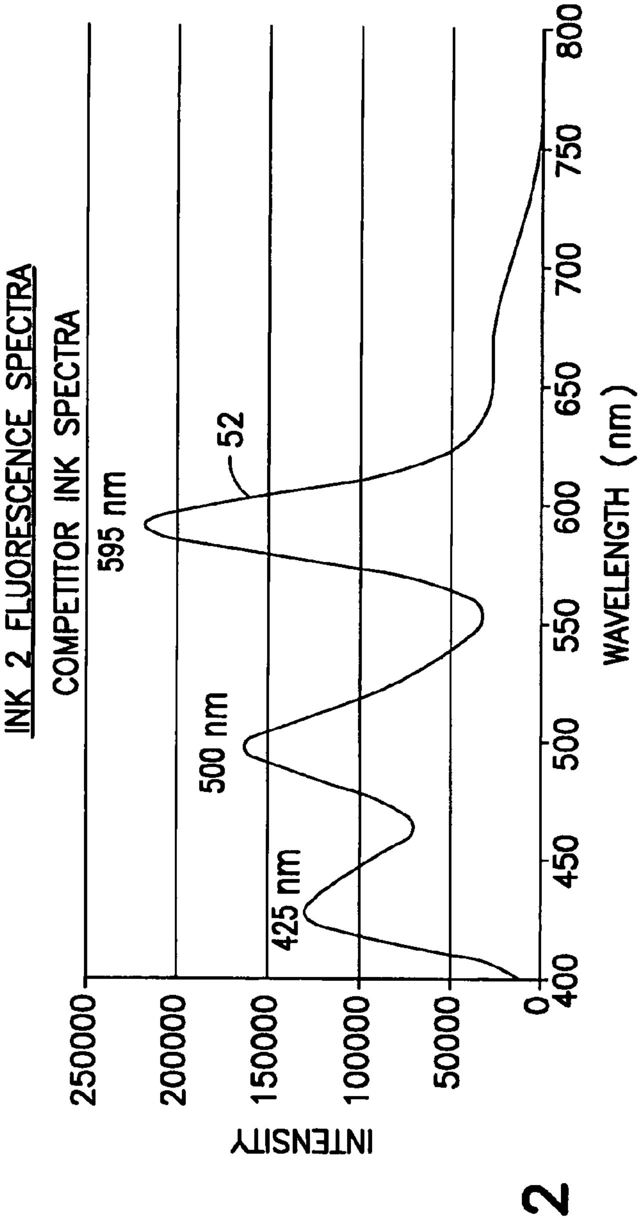
FIG. 12 shows a chart of a fluorescence spectra of intensity versus wavelength for a second fluorescent ink.
Figure 13:
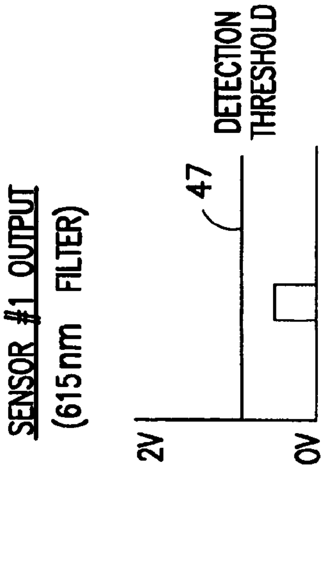
FIG. 13 is a chart which illustrates a signal from a first light-to-voltage sensor with a 615 nm filter when reading indicium printed with the ink of FIG. 12.
Figure 14:
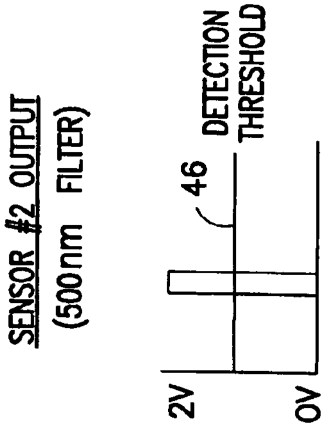
FIG. 14 is a chart which illustrates a signal from a second light-to-voltage sensor with a 500 nm filter when reading indicium printed with the ink of FIG. 12.

Referring now also to FIGS. 12-14, FIG. 12 shows a fluorescence spectra of intensity versus wavelength for a second fluorescent ink 52. In this embodiment the ink 52 comprises a red fluorescent ink sold by a third-party to the postage meter manufacturer. The postage meter photodetector system, reading an indicium printed with the third-party's ink 52 would produce the outputs shown in FIGS. 13 and 14 for its two detectors of 0,1.

Because the controller did not sense a 1,0 signal after reading the indicium, the controller can automatically determine that an unauthorized ink is being used in the postage meter. The postage meter can be programmed to perform any one of a number of different actions based upon this reading. This can include, for example, disabling the postage meter until a service technician can be called, displaying a message on the display of the postage meter (such as the ink is unauthorized or replace the ink cartridge with a proper ink cartridge), activate a communications system to send a message to the postage meter manufacturer that a third party's ink is being used (so the manufacturer can offer a discount pricing to the user to attempt to keep the user as a customer), signal a patent infringement, or signal a violation of postal codes. Of course, these are only examples. Other uses of fluorescent or luminescent ink determination and/or differentiation could be incorporated into the postage meter or fluorescent ink printer.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A fluorescent indicium printing device for printing and detecting a black fluorescent indicium comprising:

a print head configured to print the black fluorescent indicium using a black fluorescent ink, the ink including at least one black pigment and at least one fluorescent taggant;

a first ink sensor located downstream from the print head for detecting the at least one fluorescent taggant in the printed black fluorescent indicium including:

a first radiant energy source configured to radiate at a first excitation wavelength suitable for exciting the black fluorescent indicium; and a photodetector having a bandpass filter, wherein the photodetector is adapted to detect luminescent energy at a first excited luminescent wavelength from the black fluorescent indicium printed by the print head, a second ink sensor located downstream from the print head including an infrared detector for detecting the at least one black pigment in the black fluorescent indicium; and a controller for determining if the indicium comprises a particular black fluorescent ink based upon output of the first ink sensor and the second ink sensor.

2. The printing device of claim 1 wherein:

the first excitation wavelength is shorter than the shortest detectable wavelength of the photodetector.

3. The printing device of claim 2 further comprising:

a system for determining if the indicium comprises a minimum predetermined amount of fluorescence required to trigger a USPS facer/canceller.

4. The printing device of claim 1 wherein the first ink sensor is adapted to determine a quality of the indicium based upon a shape of a waveform signal from the first ink sensor.

5. The printing device of claim 1 wherein the first ink sensor is adapted to differentiate between different color fluorescent inks.

6. The printing device of claim 1 wherein the first ink sensor is adapted to differentiate between different fluorescent inks of similar color having different excitation profiles.

7. The printing device of claim 1 wherein the first ink sensor is adapted to differentiate between different fluorescent inks of similar color having different excitation profiles.

8. The printing device of claim 1 wherein the photodetector is adapted to sense at least two separate wavelengths and adapted to output a digital value based upon a detection threshold for each of the wavelengths.

9. The printing device of claim 1 wherein the bandpass filter is a narrow bandpass filter.

10. The printing device of claim 1 wherein the photodetector provides a detected voltage waveform signal having a voltage waveform shape corresponding to the detected luminescent energy.

11. The printing device of claim 1 wherein the controller is configured to determine if the indicium is of unacceptable quality.

12. The printing device of claim 11 wherein the controller is configured to indicate, if applicable, the unacceptable quality of the indicium by displaying an error message.

13. The printing device of claim 11 wherein the determination of unacceptable quality of the indicium includes determining that the indicium does not provide sufficient fluorescence to trigger a USPS facer/canceller system.

14. The printing device of claim 1 wherein the printing device comprises a postage meter and the indicium comprises a postage indicium on an article.

* * * * *